Nov. 2, 1965  E. MÜLLER ETAL  3,214,958
WORK TRANSFER DEVICES
Filed June 26, 1962  3 Sheets-Sheet 2

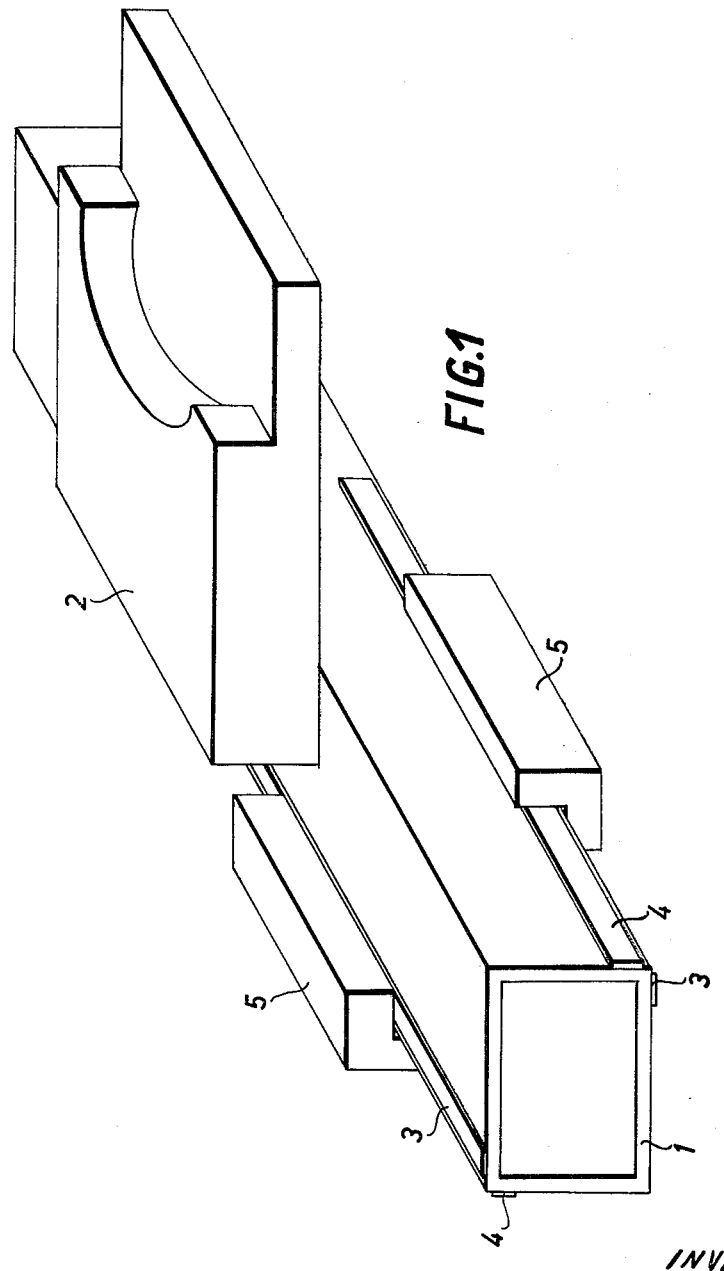

INVENTORS:
ERHARD MÜLLER,
KARL RIEHLE
by Jacob L. Kollin
ATTORNEY

United States Patent Office 3,214,958
Patented Nov. 2, 1965

3,214,958
WORK TRANSFER DEVICES
Erhard Müller and Karl Riehle, Esslingen, Germany, assignors to Fritz Müller Pressenfabrik, Esslingen (Neckar), Germany
Filed June 26, 1962, Ser. No. 205,421
Claims priority, application Germany, June 29, 1961, M 49,503
4 Claims. (Cl. 72—427)

The present invention relates to work transfer devices and in particular to carriers associated therewith. In general, the carriers in addition carry out a movement for lifting and depositing the workpiece and may move not only in a horizontal plane but also in a vertical plane.

Carriers of work transfer devices are heavy because they are made of steel or some other material having a high specific weight. The great weight of the carrier is a considerable disadvantage for the requirement of short conveyor- or idling periods during which there is no deformation of the workpieces. Since the accelerating and retarding forces in the movement of the carriers from one workpiece to another and back to their starting position increase with their average velocity, the driving and transmission elements must be of sturdy construction as in apparatus which work at a high speed. Heavy driving motors and powerful transmission elements are therefore used in known carriers, and the weight of these elements increases the mass forces that occur. Heavy drive motors also take up a great deal of space and have a high power consumption.

When a number of tools, such as presses, are arranged in line, it is necessary to use long carriers, for example 10 to 20 metres in length. Owing to the manner of assembling such long carriers and the need to periodically replace individual sections of the carriers or even whole carriers, the latter must be subdivided into relatively short pieces if they are made of a material of high specific gravity, otherwise the long lengths would be very heavy to handle. When the carriers are subdivided into a large number of parts, a large number of connecting elements are required and it involves a considerable amount of labor to assemble and dismantle the carriers so arranged along a line of presses.

According to the present invention, a work transfer device for conveying workpieces from one position to another is provided in which a work retaining means is mounted on a carrier consisting wholly or partly of a light weight material. This results in a considerable reduction in weight while maintaining the rigidity of the carrier. A considerable saving is also achieved in the driving mechanism, since as the carriers are light in weight and space saving, a relatively small drive motor may be used. The amount of space required by the motor and the necessary power required are much less than in conventional work carriers and the cost of manufacturing and operating these carriers is consequently reduced. If desired, however the type of drive normally required for a carrier made of a material of high specific gravity may be used which is combined with a carrier of a material of low specific gravity, causing the latter to run at a high speed, thereby increasing the output of workpieces.

A carrier constructed according to the invention and extending over several presses may be subdivided in such a way that one section of the carrier is lighter in weight and yet longer than the carrier section normally dealt with when assembling or replacing parts of carriers of the usual construction. The gripping devices may be arranged to be permanently attached to the sections of the carrier and there is no need to detach them for the sake of easier handling or because of excessive weight.

This is a great advantage when a row of presses have to be frequently readjusted from one type of workpiece to another.

It is often necessary or at least desirable to guide the carrier on the press or elsewhere by means of a separate guide, for example in order to prevent bending or twisting of the carrier. If the carrier itself is not made of a wear resistant material which has a low frictional resistance, then guide tracks may be made of such a material. When using roller guides, high specific compression may occur between the associated guide elements, and the guide tracks must then be made of a material capable of withstanding this, in order to avoid damage.

When using a carrier made of light metal, it is advantageous to use a guide track of plastic material if it is required to have good guiding properties without needing much servicing, whereas if the guide track is liable to be subjected to high specific pressures it is advisable to have a guide track in the form of a steel band which may be fixed to the carrier.

When a carrier extends over several workpieces or presses, in particular over the length of a line of presses, it may be advantageous to have portions of the carrier made of plastic alternate with portions made of some other material, for example light metal or steel, the arrangement depending on the requirements of the particular case. The construction of the carrier may thereby be perfectly adapted to the particular requirements.

Instead of making a carrier or part of a carrier entirely of light metal or plastic, it is possible to make certain sections, for example, half of a wall of the carrier, a guide element or the like of some other material. This applies particularly to those sections which are subjected to stresses which a material of lower specific gravity cannot withstand. In general, the section which is made of a different material from that of the main body of the carrier is detached from the latter in that the latter consists of a single connected piece. The two materials may be joined together without special fastening means.

The invention will be further described, by way of example with reference to the accompanying drawings illustrating a preferred embodiment thereof.

It should be understood, however, that these are given by way of illustration and not of limitation, and that various changes in the details, form and arrangement of the parts may be made without departing from the scope of the invention.

In the drawings:

FIG. 1 is an enlarged constructional detail in perspective, of the press according to the invention;

Figure 3:
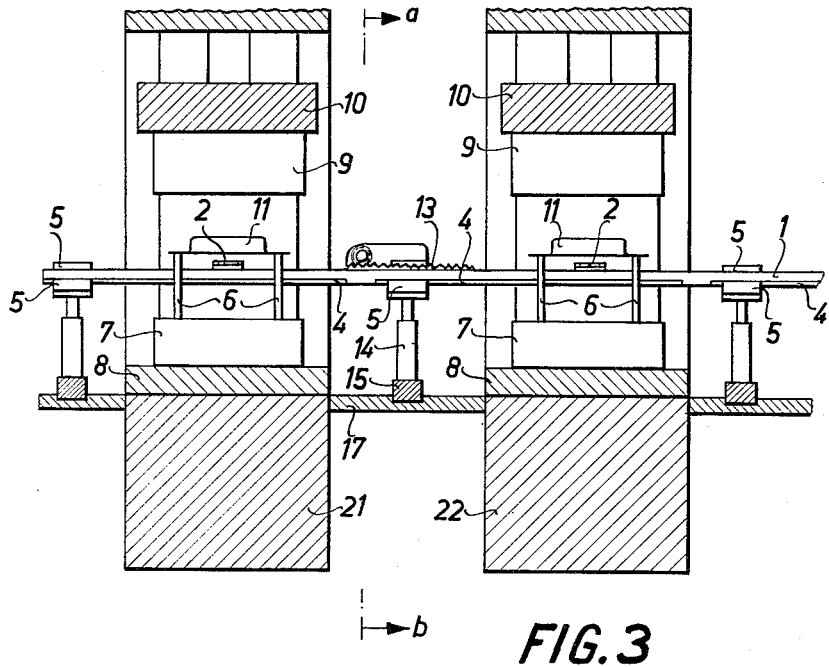
FIG. 3 is a schematic view taken on line c–d of FIG. 2.

Referring now to the drawings in detail, a carrier 1 of rectangular cross-section is made of a light metal or plastic and may be manufactured in an extrusion press. To simplify the manufacturing process, the edges and corners of the carrier may be rounded.

The carrier has a number of gripping elements 2 fixed to it; only one such element being shown in the drawing on the upper surface of the carrier. These gripping elements 2 co-operate with the associated gripping elements on an adjacent carrier to grip and hold a work piece which is manufactured for example on a press. They may be mounted in a simple manner on the perpendicular surfaces forming the rectangular carrier.

The carrier 1 may be guided. As the part of the carrier running along a guide is generally subjected to high stresses, it is advisable to reinforce the carrier with a wear-resistant material with a low frictional resistance. In the example shown, this is achieved by providing two plastic or steel strips 3, 4 arranged on the carrier at right angles to one another. A guide 5 which also forms a right angle fits over the strips 3 and 4. When the carrier is made of plastic, the guide tracks which are subjected to a lot of stresses are reinforced with a steel band. When the material of the carrier does not have good gliding properties, a plastic having these properties may be used for the reinforcing or protective strip.

The carriers are arranged in pairs on either side of a row of tools which may be attached to the same or different presses, and these carriers are provided with associated gripping elements for the work pieces. When the pressing is completed, the carriers are moved towards the work piece so that the gripping elements grip the work piece from underneath. The carriers are then raised and the work pieces are thereby lifted from the tools. This movement is followed by a conveyor movement to the next tool, on which the work piece treated by the preceding tool is deposited. The carriers then move away from one another and return to their starting position.

Figure 2:
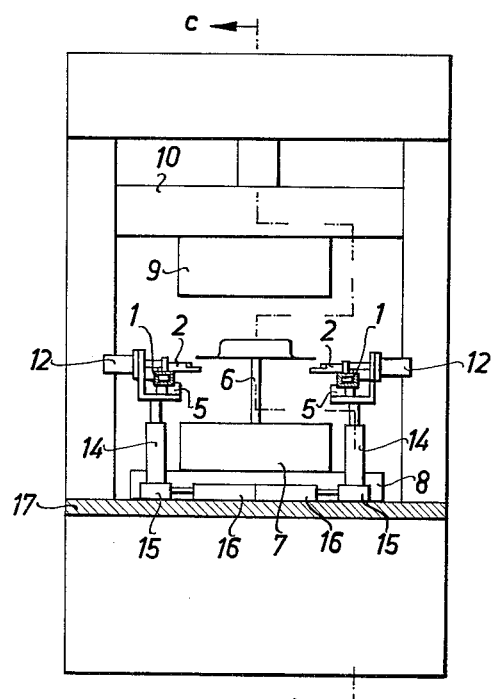
FIG. 2 is a schematic elevational view of the press, taken on line a–b of FIG. 3.
Figure 4:
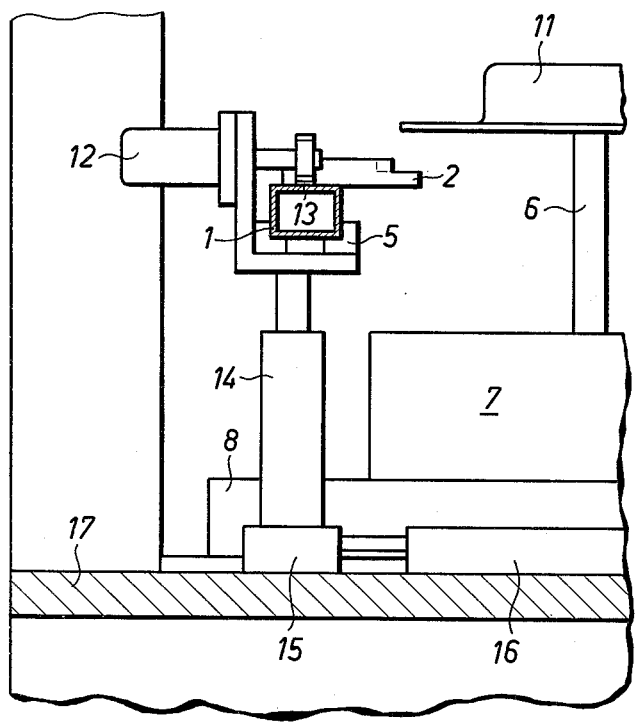
FIG. 4 is an enlarged detail in elevation, partly in section, illustrating the relation of the power means to the carriers.

A pair of successive presses 21 and 22 of a press row employing the work transfer device according to the invention are shown in FIGS. 2 and 3. Each of the presses comprises a self-contained frame in which is vertically displaceable a press ram 10. This press ram carries an upper tool part 9, which cooperates with a lower tool part, disposed on press table 8, to produce a sheet iron shaped piece. Studs 6, for lifting out the workpiece or drawn part 11 out of the lower tool part, are provided.

The carrier 1, shown in FIG. 1, extends outwardly over several presses, in which it is displaceable in guide angles 5. An electric, hydraulic or pneumatic motor 12, mounted on one of the guide angles 5, serves to displace the carrier. A pinion driven by the motor engages with a gear rack 13.

A servo piston of a hydraulically or pneumatically operated power cylinder 14 engages the mutually associated guide angles 5. The power cylinder is secured on a slide 15. This slide, which is mounted on an intermediate table 17, is likewise displaceable by means of a horizontally mounted power cylinder 16. Instead of this power cylinder there may be used a motor similar to motor 12, which may be provided with a pinion engaging with a gear rack.

To advance the workpiece 11 it is lifted out of the lower tool part 7 by means of studs 6. The slides 15, and thereby the carriers 1, are displaced laterally towards the workpiece through power cylinder 14 and guide angles 5 by actuating power cylinder 16, so that the gripping elements 2 move under the workpiece. The guide angles 5, and thereby also the carriers 1 are raised by the operation of the power cylinders 14 and the workpiece 11 is withdrawn from the studs 6 through the engagement with the gripping elements 2. The carriers are next displaced longitudinally in a forward direction until the workpiece of the preceding press is disposed over the lower tool part of the following press. By lowering the guide angles 5 with the help of power cylinder 14, the workpiece 11 is lowered on the underlying studs 6 while releasing the gripping elements. The gripping elements 2 are returned to their rest position, while slides 15 ride outwardly and each carrier is moved back lengthwise into its original, position by its respective motor.

The studs 6 set down the workpiece on the lower tool part by a vertical movement and the further shaping of the workpiece in the following press can now proceed.

With the help of carriers extending lengthwise over a press row, a workpiece can be guided to a press from a preceding press and the workpiece shaped by it can be set down on a succeeding press. The carriers may be inserted in a transfer press in a similar manner. The parts of the mechanism for actuating the carrier (motor 12 as well as power cylinders 14 and 16) may be controlled manually or automatically.

What I claim is:

1. In a press row, a pair of spaced press tables, a lower work-shaping tool fixedly mounted on each of said press tables, a pair of parallelly spaced elongated workpiece carriers extending through the presses above said press tables, guide members for said carriers, at least one gripping element mounted on each of said carriers, an intermediate table extending through said presses in the direction of said workpiece carriers, slides movably mounted on said intermediate table on each of the sides of said press tables, said slides being aligned transversely of said carriers, a power cylinder vertically mounted on each of said slides and operably connected to said gripping elements through said guides for displacing these in a vertical direction, power means operably connected to said slides for advancing the gripping elements through said cylinders towards one another for gripping a workpiece, rack and pinion mechanisms for advancing said carriers in their longitudinal direction and motors, connected to each of said mechanisms and mounted on each of said guide members for operating said mechanisms.

2. In a press row, a plurality of spaced press tables, a lower work-shaping tool fixedly mounted on each of said press tables, a pair of parallelly spaced elongated workpiece carriers extending through the presses above said press tables, said carriers being made of a material of light specific weight, guide members for said carriers, said carriers having guide portions of wear and friction resistant material, at least one gripping element mounted on each of said carriers, an intermediate table between said presses in the direction of said workpiece carriers, slides movably mounted on said intermediate table on each of the sides of said press tables, said slides being aligned transversely of said carriers, first power means mounted on each of said slides and operably connected to said gripping elements through said guides for displacing these in a vertical direction, second power means operably connected to said slides for advancing the gripping elements towards one another in a lateral direction for gripping a workpiece, third power means for advancing said carriers in their longitudinal direction.

3. The device according to claim 2, wherein said first and second power means for advancing the gripping elements are hydraulic power cylinders.

4. The device according to claim 2, wherein said third power means for advancing the gripping elements are rack and pinion mechanisms and motors, connected to each of said mechanisms and mounted on each of said guide members for operating said mechanisms.

References Cited by the Examiner

UNITED STATES PATENTS

| | | | |
|---|---|---|---|
| 765,988 | 7/04 | Otis | 78—99 |
| 2,763,167 | 9/56 | Sahlin | 78—99 |

CHARLES W. LANHAM, *Primary Examiner.*